March 11, 1924.
J. D. YOUNG
TIRE CHAIN HOOK
Filed Sept. 11, 1923
1,486,557
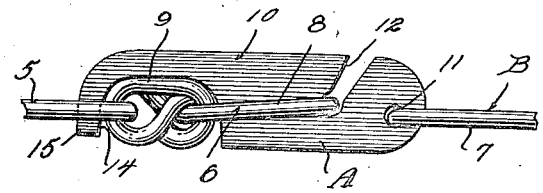
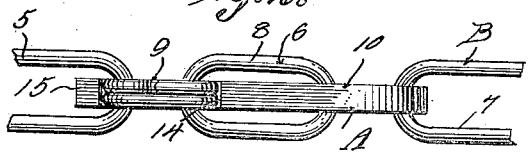
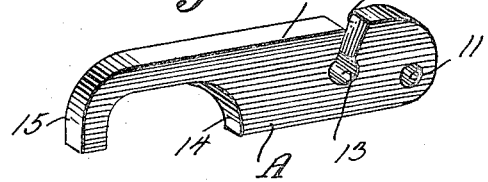
WITNESSES
Guy M Spring
George W. Wright
Inventor
JOSEPH D. YOUNG
By Richard B. Owen, Attorney Patented Mar. 11, 1924.

1,486,557

UNITED STATES PATENT OFFICE.

JOSEPH D. YOUNG, OF NEWPORT, WASHINGTON.

TIRE-CHAIN HOOK.

Application filed September 11, 1923. Serial No. 662,127.

*To all whom it may concern:*

Be it known that I, JOSEPH D. YOUNG, a citizen of the United States, residing at Newport, in the county of Pend Oreille and State of Washington, have invented certain new and useful Improvements in a Tire-Chain Hook, of which the following is a specification.

This invention appertains to vital improvements in means for connecting the terminals of a chain together and one of the primary objects of the present invention, is to improve the construction of hooks utilized for connecting the terminals of antiskid chains together, so that accidental displacement of the chain through loosening of the hook, when the chain is in use, will be reduced to a minimum.

Another prime object of the invention is to provide novel means for connecting the terminals of an antiskid tire chain together embodying a hook carried by one end of the chain so constructed as to receive the entire link of the opposite end of the chain, whereby accidental movement and displacement of the link will be prevented, and whereby undue wear upon the link will also be eliminated, thereby effectively insuring the longevity of the tire chain.

A further object of the present invention is to provide a hook, which is especially adapted to be used with the new form of antiskid Weed chain, the hook having a diagonally extending slot therein for receiving the loop portion of the end chain link and a recess in the opposite longitudinal edge thereof for receiving the eye portion of the end link, the arrangement of the slot and recess being such, that when a longitudinal or circumferential pull is placed upon the chain, the eye portion of the link will be firmly held in the recess, thereby effectively preventing displacement of the hook from out of engagement with the said link.

A still further object of the invention is to provide a tire chain hook of the above character, which will be durable and efficient in use, one that will be simple and easy to manufacture, and one which can be placed upon the market at a very small cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved hook, showing the same in operative position for connecting together the terminals of an antiskid chain.

Figure 2 is an edge view of the same showing the hook in operative position connecting the terminals of an antiskid chain together, and Figure 3 is a perspective view of the improved hook.

Referring to the drawings in detail, wherein similar reference characters designate corresponding parts throughout the several views, the letter A generally indicates the improved hook for connecting the terminals of an antiskid chain B together. The antiskid chain B has been shown of the new Weed type and includes a plurality of intermediate links 5 and terminal links 6 and 7. The links 5, 6 and 7 are all constructed the same, and each include a loop portion 8, and a right angularly disposed eye portion 9 for receiving the loop portion 8 of the next adjacent chain. As shown the eye portion 9 of each loop is of a substantially elliptical form.

The improved hook A comprises a flat longitudinally extending body 10 having a transverse recess 11 formed therein at one terminal thereof for receiving the end link 7. Adjacent to the transverse opening 11, one longitudinal edge of the body 10 is provided with an inwardly extending diagonally disposed slot 12, for receiving the loop portion 8 of the terminal link 6. The inner end of the slot 12 can terminate in an enlarged portion 13 so as to form a seat for the loop portion 8 of the link and thereby prevent the displacement thereof.

The opposite longitudinal edge of the body 10 adjacent to the terminal of the body remote from the transverse opening 11 is provided with an enlarged notch or recess 14 which is of a size and configuration to snugly receive the entire eye portion 9 of the terminal link 6, when the hook is in a position to operatively engage said terminal link. The formation of the notch or recess 14 provides a curved bill or hook 15, which is adapted to extend into the loop portion 8 of the first intermediate chain link 5, when the hook is in its operative position.

When it is desired to connect the terminal links 6 and 7 together, the free end of the body portion 10 of the hook A is slipped through the loop portion 8 of the terminal link 6 until the said loop portion slides into the slot 12 after which the body is swung down so that the eye portion 9 will readily fit into the notch 14 and hook portion 15 will move into the loop portion 8 of the intermediate link 5 of the chain adjacent to the terminal link 6. When the chain is placed under longitudinal stress, it is evident that the hook will be normally maintained tightly in its operative position as shown, in Figure 1 of the drawing, which will effectively prevent displacement of the hook and the loosening of the chain.

It can be further seen that the entire terminal link 6 lies within the plane of the hook A, thereby reducing wear upon the said hook and also reducing strain thereon.

From the foregoing description, it can be seen that I have provided an exceptionally simple and durable device for connecting the terminals of the new type of Weed chain together.

Changes in details may be made without departing from the spirit or the scope of this invention.

What I claim as new is:

1. The combination with the end links of a chain, of a one piece connecting member between said links attached at one end to one of said links for swinging movement and having intermediate its ends an inwardly directed notch extending obliquely to the longitudinal axis of the member in which the other link is adapted to detachably seat, the member also having a notch formed therein for receiving the opposite end of the link from which is seated in said obliquely extending notch.

2. The combination with the end links of a chain, of a connecting member between said links attached on one end to one of the links for swinging movement and having intermediate its ends an inwardly directed slot extending obliquely to the longitudinal axis of the member in which one end of the other link is adapted to detachably seat, the member having a relatively deep notch formed therein for receiving the end of the last mentioned link remote from the end which is seated in the slot, the said last mentioned link lying wholly within the plane of said member.

3. The combination with a chain including intermediate links and end links, of a connecting member between said end links attached at one end to one of the end links, each of the links including a loop portion and an eye portion disposed at right angles to the loop portion, the member having an inwardly directed slot extended obliquely to the longitudinal axis thereof adjacent to the point of connection of the member with the mentioned link, for receiving the loop portion of the other end link, the member having a relatively deep notch formed in one longitudinal edge thereof adjacent to its free end for receiving the entire eye portion of the last mentioned end link.

In testimony whereof I affix my signature in presence of two witnesses.

JOSEPH D. YOUNG.

Witnesses:
J. M. T. MATHIEM,
EDNA VAMTER.